United States Patent
Re et al.

(10) Patent No.: US 8,936,321 B2
(45) Date of Patent: Jan. 20, 2015

(54) FLANGED BEARING RING FOR THE HUB OF A MOTOR VEHICLE WHEEL

(75) Inventors: Paolo Re, Nichelino (IT); Andreas Knopf, Würzburg (DE)

(73) Assignee: Aktiebolaget SKF, Gothenburg (SE)

( * ) Notice: Subject to any disclaimer, the term of this patent is extended or adjusted under 35 U.S.C. 154(b) by 303 days.

(21) Appl. No.: 13/426,788

(22) Filed: Mar. 22, 2012

(65) Prior Publication Data
US 2012/0248858 A1 Oct. 4, 2012

(30) Foreign Application Priority Data
Mar. 29, 2011 (IT) ............... TO2011A0278

(51) Int. Cl.
| | |
|---|---|
| B60B 27/00 | (2006.01) |
| F16C 33/64 | (2006.01) |
| B22D 19/04 | (2006.01) |
| F16C 33/76 | (2006.01) |
| F16C 33/60 | (2006.01) |
| F16C 19/38 | (2006.01) |

(52) U.S. Cl.
CPC ............ *B60B 27/0005* (2013.01); *B22D 19/04* (2013.01); *B60B 27/0073* (2013.01); *F16C 33/64* (2013.01); *F16C 33/768* (2013.01); *F16C 33/60* (2013.01); *B60B 2360/102* (2013.01); *B60B 2360/104* (2013.01); *B60B 2360/32* (2013.01); *B60B 2900/5114* (2013.01); *B60Y 2200/11* (2013.01); *F16C 19/386* (2013.01); *F16C 2326/02* (2013.01)
USPC ............................ 301/109; 384/544; 384/492

(58) Field of Classification Search
CPC ........ F16C 33/60; F16C 33/605; F16C 33/64; F16C 33/72; F16C 33/768; B60B 27/0073; B60B 27/0094
USPC ............ 301/105.1, 109, 110, 110.6; 384/492, 384/515, 544, 564
See application file for complete search history.

(56) References Cited

U.S. PATENT DOCUMENTS

| | | | | |
|---|---|---|---|---|
| 3,583,511 | A | * | 6/1971 | Asberg .................... 180/370 |
| 4,715,780 | A | * | 12/1987 | Kan ........................ 415/200 |
| 6,497,515 | B1 | * | 12/2002 | Sahashi et al. .......... 384/544 |
| 2003/0210842 | A1 | * | 11/2003 | Tajima et al. ............ 384/544 |

(Continued)

FOREIGN PATENT DOCUMENTS

| | | |
|---|---|---|
| EP | 0297552 A2 | 1/1989 |
| EP | 1795788 A2 | 6/2007 |
| WO | WO2008147284 A1 | 12/2008 |

(Continued)

*Primary Examiner* — Kip T Kotter
(74) *Attorney, Agent, or Firm* — Bryan Peckjian; SKF USA Inc. Patent Department

(57) ABSTRACT

A flanged bearing ring for a motor vehicle wheel includes two different materials joined as a single piece: a tubular core and an outer body around the core. The outer body forms a radial flange and is made of a lighter material than that of the core. The ring further includes an element of generally tubular shape, which contacts both the outer body and the inner core to cover and seal with continuity a circular line of separation at the end of the interface surface between the core and the outer body at the axially outer side of the ring. The tubular element further forms a cylindrical axial edge which extends in an axially inner direction and is fixed in the axially outer end of the core cavity, and a cylindrical tubular portion, projecting in an axially outer direction beyond the flange, for centering the vehicle wheel.

10 Claims, 2 Drawing Sheets

(56) References Cited

U.S. PATENT DOCUMENTS

2004/0022471 A1 2/2004 Yamamoto
2010/0331093 A1 12/2010 Ozawa et al.

FOREIGN PATENT DOCUMENTS

WO WO2010063299 A1 6/2010
WO WO 2010133233 A1 * 11/2010

* cited by examiner

FLANGED BEARING RING FOR THE HUB OF A MOTOR VEHICLE WHEEL

CROSS-REFERENCE TO RELATED APPLICATION

This United States Non-Provisional Utility application claims the benefit of copending Italy Provisional Patent Application Serial No. TO2011A000278, filed on 29 Mar. 2011, which is incorporated herein in its entirety.

FIELD OF THE INVENTION

The present invention relates to a lightweight, flanged bearing ring for the hub of a motor vehicle wheel, particularly a rotatable ring with a flange providing connection to the wheel and/or the brake rotor.

SUMMARY OF THE INVENTION

The motorcar industry has to face an ever increasing demand for weight reduction in motor vehicle components for the sake of cutting down fuel consumption and exhaust emissions. With a vehicle wheel bearing, weight reduction may not imply any reduction in strength and safety. The raceways must be made of a material hard enough to resist the stresses of rolling contact; for this purpose, in the vast majority of cases, the raceways are made of a bearing grade steel. The raceways are heat treated so as to attain a level of hardness and microstructure homogeneity adequate to withstand the stresses caused by rolling Hertzian contact.

Recent flanged bearing rings include a radially inner, annular or tubular insert (or core) made of bearing grade steel and forming one or two raceways, and a radially outer body forming a radially outwardly extending flange around the insert and made of a lightweight material such as aluminium alloy. The lightweight flange is designed to mount the wheel and/or the brake rotor and transfer loads from these components to the tubular insert.

WO 2008/147284 A1 discloses a bearing ring made up of two different materials joined together in a single piece, namely a first, high toughness material such as bearing grade steel forming the raceways and a second, lightweight material, such as a lightweight metal, forming the rest of the ring. The second material is joined to the first material by a semi-solid casting process.

It has been observed that, with bearing rings of the above type, a weak point is given by the area where the interface surface between the two parts of different materials (tubular steel core, outer body of lightweight material) opens on the axially outer side, or outboard side of the bearing. In working conditions, openings along the interface surface between the two different materials tend inevitably to form.

In working conditions, the loads coming from the wheel transmit to the flange of the light-alloy outer body a bending moment which tends to separate the outer body from the core. Furthermore, repeated cycles of thermal stresses cause a differential thermal expansion between the outer body made of aluminum and the steel core, which has a coefficient of thermal expansion lesser than that of aluminum alloys. The infiltration of contaminants such as water, dust, salt, over time causes micro-cracks to broaden and the formation of rust. Experimental tests carried out by the Applicant have shown the occurrence of problems of galvanic corrosion with the use of certain types of light alloy, having a considerable difference in electrochemical potential than the steel. Salt, or even more simply water, can in fact be an electrolytic means having a high capability of penetration in micro-cracks. Because of all these factors, there is a risk that the coupling between the outer body of light alloy and steel core deteriorates, resulting in fretting (sliding) and possibly failure of the flanged ring.

It is an object of the invention to provide a bearing ring made of two parts of different materials coupled together in a reliable, long-lasting ad watertight manner, so as to overcome the inconveniences of above-mentioned state of the art.

The above and further objects and advantages are attained, in accordance with the invention, by a flanged bearing ring having the features set forth in claim 1. Preferred embodiments of the invention are defined in the dependent claims.

BRIEF DESCRIPTION OF THE DRAWINGS

In order that the present invention may be well understood there will now be described a preferred embodiment thereof, given by way of example, reference being made to the accompanying drawings, in which.

DETAILED DESCRIPTION OF THE INVENTION

Figure 1:
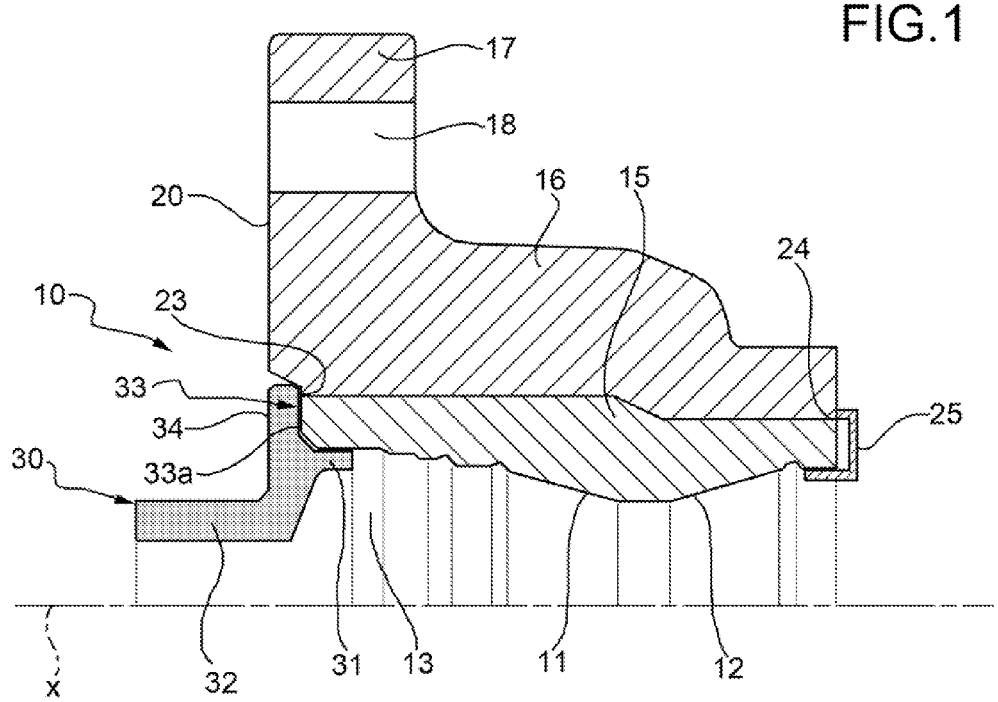
FIG. 1 is an axial cross-sectional partial view of a first embodiment of a flanged bearing ring according to the invention.

Referring initially to FIG. 1, designated overall at 10 is a flanged bearing ring in accordance with an embodiment of the invention. The ring 10, in this example, is designed to be the outer, rotatable ring of a double-row angular contact ball bearing for vehicle applications, particularly for mounting to a vehicle wheel (not shown) to be rotationally supported relative to a stationary suspension standard, about a central axis of rotation x. Throughout the present description and the claims, terms and expressions indicating positions and directions such as "radial" and "axial" are understood as referring to the axis of rotation x of the bearing. Expressions such as "axially inner" and "axially outer" instead refer to a condition when mounted on a vehicle.

The ring 10 comprises a radially inner insert or core 15 of a generally tubular shape and a radially outer body 16 with a radially outwardly extending flange 17 at the outboard side of the core 15. The flange 17 provides a number of bores 18 to allow connection to the vehicle wheel by means of stud bolts (not shown). The flange 17 has a axially outer flat radial surface 20 defining a precise reference surface against which the wheel or brake disc is intended to rest.

The core 15 forms an axially extending inner cavity 13, in which two raceways 11, 12 are obtained and is made of a first, hard and tough material, preferably a bearing grade steel. The radially outer body 16 is made of a second, lightweight material. A lightweight metal is preferred, such as aluminium, magnesium, or alloys thereof. Other suitable materials for the outer body may include, but not be limited to, carbon composites or reinforced polymers.

The outer body 16 may be formed around the core 15 in a number of different ways, for example through a semi-solid casting process, or by sintering or casting, or die-casting. At the end of any of these processes, the lightweight material tightly copies the shape of the radially outboard surface of core 15, whereby the inner and outer bodies interlock with one another.

In order to provide adequate structural support to the outer body 16, the steel core 15 extends axially through the whole width of the outer body. At the outboard side of the ring 10, where the flange 17 is provided, the steel core 15 does not extend axially up to the radial plane in which the flat surface 20 of flange 17 lies. At the axially outer end of the bearing ring, the interface surfaces between the outer body 16 and the core 15 end with a circular separation line 23 located in a recess or axially recessed area 21 with respect to the radial plane of the flat surface 20. The recess 21 is formed in part by the outer body 16 and in part by the inner core 15 and extends circumferentially around the central axis of rotation x.

Figure 2:
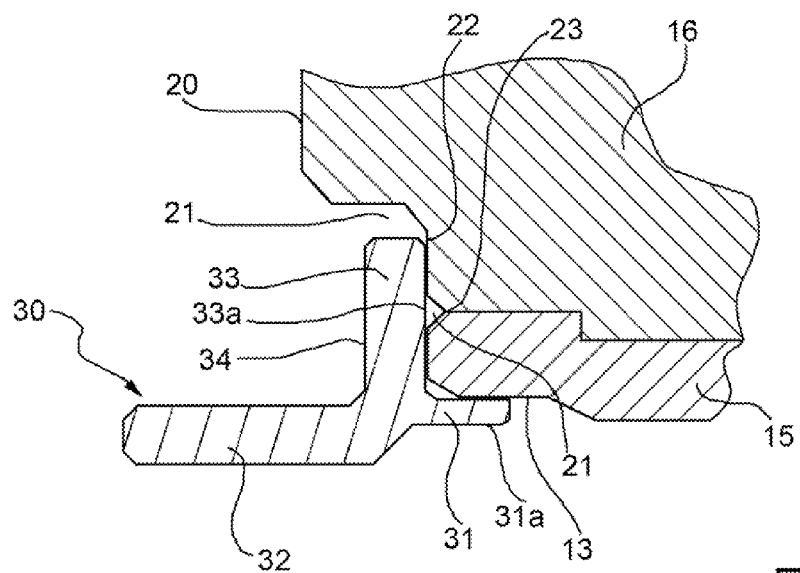
FIG. 2 is an enlarged view of a detail of a flanged bearing ring according to a second embodiment of the invention.

In the embodiments of FIGS. 1 and 2, the separation line 23 which defines the end of the interface surface between the outer body 16 and the inner core 15 at the outboard side of the ring 10 lies in or opens onto a flat radial surface, facing an axially outer direction.

The ring 10 comprises a generally tubular shaped element 30 which has an axial cylindrical edge 31 which extends in an axially inner direction, a cylindrical tubular portion 32 which extends in an axially outer direction, and a flange 33 extending in a radially outer direction. The cylindrical edge 31 is forcedly fitted, with radial interference, in the axially outer end of the cavity 13 of the core 15 so as to steadily mount the element 30 to the ring 10. The tubular portion 32 is a cylindrical protuberance which protrudes axially from the radial surface 20, in order to facilitate the centering of the vehicle wheel (not shown). The flange 33 is accommodated in the recess 21, and extends in a radially outer direction so as to abut against a radial surface 22 of recess 21 provided by the outer body 16.

As shown more clearly in FIG. 2, the element 30 contacts with continuity, along the whole circumferential ring 10, both the core 15 and both the outer body 16. The core 15 is contacted through the radially outer cylindrical surface 31a of the cylindrical edge 31 forcibly inserted into the cavity 13; the outer body 16 is contacted by means of a axially inner radial surface 33a of the flange 33 which rests against the surface 22 of the body 16. In this way, the surface 33a of the tubular element 30 continuously covers the separation line 23 between the steel of the core 15 and the lightweight metal of the outer body 16, thereby sealing the interface between these two bodies from the outboard side of the ring 10.

In the embodiment of FIG. 1, the flange 33 has a axially outer radial surface 34 which is coplanar or substantially coplanar with the axially outer surface 20 of flange 17 and advantageously cooperates therewith in defining the radial resting surface for the wheel or the brake rotor.

Figure 3:
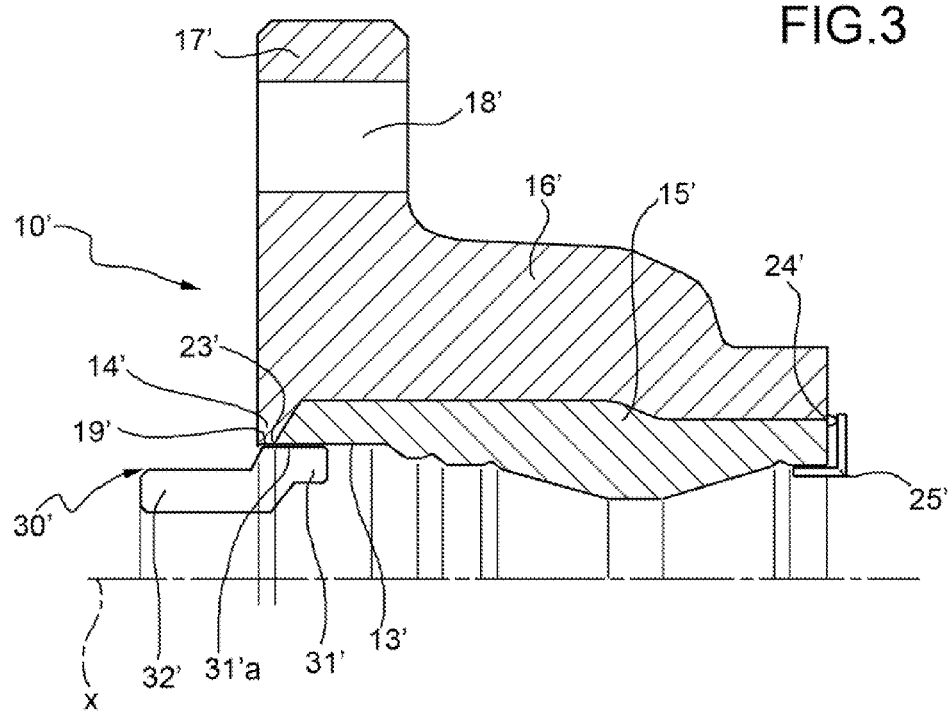
FIG. 3 is a view, similar to that of FIG. 1, of a third embodiment of the invention.

In the embodiment of FIG. 3, the separation line 23' which identifies the end of the interface surface between the outer body 16' and the inner core 15' at the outboard side of the ring 10' lies between or opens in a radially inner direction between two axially consecutive cylindrical surfaces of equal inner diameter.

The circular line 23' separates the axial cylindrical cavity 13' of the core 15' from a cylindrical surface 19' provided by an edge 14' which protrudes in a radially inner direction from the axially outer end of the outer body 16'. Similarly to the embodiments of FIGS. 1 and 2, also in the variant of FIG. 3, the tubular element 30' comprises a cylindrical tubular portion 32', which extends in an axially outer direction for centering the wheel, and an axial cylindrical edge 31' which extends in an axially inner direction. The edge 31' is forcefully fitted, with radial interference, in the cylindrical cavity defined by the two axially aligned and consecutive cylindrical surfaces 19' and 13'. The radially outer cylindrical surface 31a' of the edge 31' covers continuously the separation line 23 'between the core 15' and the outer body 16', by sealing the interface between these two bodies at the outboard side of the ring 10'. In the embodiment of FIG. 3, the element 30' does not form any flange of the type indicated with 33 in FIGS. 1 and 2.

The tubular element 30, 30' is made of a rigid or substantially rigid material, for example a plastic material such as a polymer, or a metallic material, preferably coated with an anticorrosion and electrically insulating layer. For example, the anti-corrosion of the tubular element in iron or steel may be obtained through cataphoretic coating, or by other surface coating treatments with epoxy or acrylic resins.

Figures 4, 5:
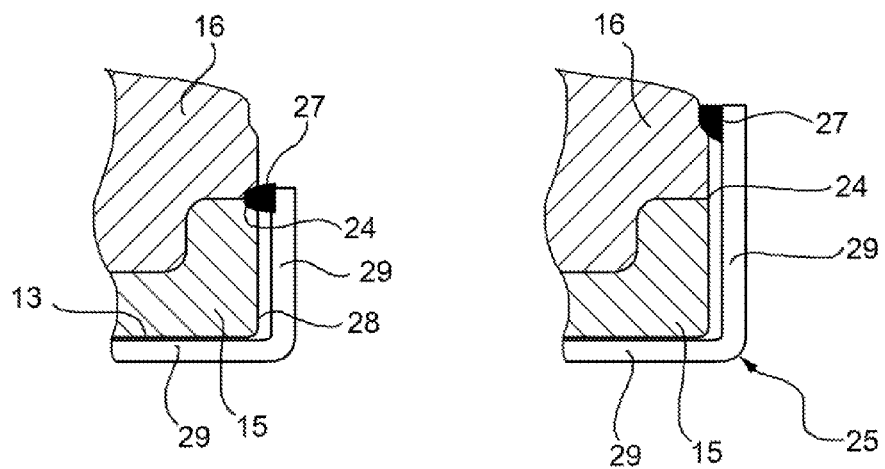
FIGS. 4 and 5 show, on an enlarged scale, two variants of a detail visible in FIGS. 1 and 3.

At the inboard side of the ring, the interface between the outer body 16 and the core 15 ends with a circular line of separation 24. The seal between the core and the outer body from this side is ensured by a sealing device comprising a rigid annular insert 25, preferably metal, having a substantially L-shaped axial cross-section, with a cylindrical wall 26 forcefully fitted, with radial interference, in the cylindrical cavity 13 of the tubular core 15, and a radial wall or flange 29 which extends in a radially outer direction. The radial wall 29 carries an annular sealing gasket 27 of rubber or elastomeric material which either acts directly on the separation line 24, (FIG. 4), or acts against a surface 28 of outer body 16 (FIG. 5), at a concentrically or radially outer position with respect to the line 24, so as to continuously seal along an entire circumference around the x axis, the interface between the core 15 and the outer body 16 at the axially inner end of the ring.

What we claim is:

1. A flanged bearing ring for a motor vehicle wheel, the ring including a first hardened material and a second material, wherein the first material and the second material are two different materials joined together as a single piece, the ring comprising:

a radially inner tubular or annular core which forms at least one raceway around a central axis of rotation, the core providing a radially outer surface, an axially extending inner cavity and being made of the first hardened material;

a radially outer body which is formed around said outer surface of the core defining with this surface an interface surface, forms a radially outwardly extending flange around the core, and is made of the second material, wherein the second material is softer than the first hardened material; and an element of generally tubular shape, which contacts both the outer body and the inner core so as to cover and seal with continuity, along an entire circumference around the axis, a circular line of separation at the end of the interface surface between the core and the outer body at the axially outer side of the ring, forms a cylindrical axial edge which extends in an axially inner direction and is fixed in the axially outer end of the cavity of the core, and also forms a cylindrical tubular portion projecting axially beyond the radially outwardly extending flange for centring the vehicle wheel.

2. The flanged ring according to claim 1, wherein the circular separation line lies on a radial surface facing an axially outer direction.

3. The flanged ring according to claim 2, wherein the tubular element further forms a flange extending in a radially outer direction and that the circumferential continuous contact with the outer body and the core is provided by an axially inner, radial surface of the flange which rests against an axially outer, radial surface of the outer body, and by a radially outer, cylindrical surface of the cylindrical edge forcefully fitted into the cavity of the inner core.

4. The flanged ring according to claim 3, wherein at the outboard side of the ring, where the flange is provided, the inner core does not extend axially up to the radial plane in which an axially outer, radial flat surface of the radially outwardly extending flange lies, whereby the circular separation line is located in an area which is axially recessed with respect to the flat surface, the axially recessed area is formed in part by the housing and in part by the inner core, and that the flange of the tubular element is accommodated in the axially recessed area.

5. The flanged ring according to claim 4, wherein the flange of the tubular element has an axially outer radial surface substantially coplanar with the axially outer surface.

6. The flanged ring according to claim 1, wherein the circular separation line is arranged between two cylindrical, axially aligned and consecutive surfaces having an equal inner diameter, of which a first surface, located at an axially outer position, is formed by an edge protruding in a radially inner direction from the outer body, and second one of the two cylindrical surfaces is formed by the axial cylindrical cavity of the core, and that the continuous circumferential contact with the outer body and the core is provided by a radially outer cylindrical surface of the cylindrical edge forcefully fitted into the said first and second cylindrical surfaces.

7. The flanged ring according to claim 1, wherein the tubular element is made of substantially rigid material and at least its outer surfaces exhibit anti-corrosive and electrically insulating properties.

8. The flanged ring according to claim 1, further comprising a second circular separation line at the surface interface between the core and the outer body at the axially inner side of the ring, wherein said second line is sealed by a sealing device comprising an annular supporting shield fixed in the cylindrical cavity of the core, and an annular sealing gasket of elastomeric or rubber-like material which is supported by the annular shield and rests directly against the second separation line or against a surface of the outer body at concentrically or radially outer position with respect to the second separation line, so as to continuously seal along an entire circumference around the axis, the interface between the core and the outer body at the axially inner end of the ring.

9. The flanged ring according to claim 8, wherein the supporting shield consists of a rigid annular insert having a substantially L-shaped axial cross-section, with a cylindrical wall forcefully fitted with radial interference in the cylindrical cavity of the core and a radial wall which carries a seal.

10. The flanged ring according to claim 9, wherein the radial wall of the supporting shield extends in a radially outward direction up to at least the level of the second separation line.

* * * * *